United States Patent [19]

Riordan et al.

[11] 4,224,496

[45] Sep. 23, 1980

[54] METHOD AND APPARATUS FOR CONTROLLING A BRAZING MACHINE

[75] Inventors: Edward D. Riordan, South Somerville; John P. Mangan, Iselin, both of N.J.

[73] Assignee: Joyal Products, Inc., Linden, N.J.

[21] Appl. No.: 950,819

[22] Filed: Oct. 12, 1978

[51] Int. Cl.² .............................................. B23K 11/24
[52] U.S. Cl. .................................. 219/110; 219/117.1
[58] Field of Search ............. 219/108, 109, 110, 117.1

[56] References Cited

U.S. PATENT DOCUMENTS

| 2,817,747 | 12/1957 | Devonshire et al. | 219/110 |
| 3,406,272 | 10/1968 | Ehrlich | 219/108 |
| 3,440,389 | 4/1969 | Meyer | 219/110 |
| 3,778,581 | 12/1973 | Denny | 219/110 |
| 4,079,225 | 3/1978 | Warner | 219/110 |

FOREIGN PATENT DOCUMENTS 2445132  3/1975  Fed. Rep. of Germany ........... 219/110

Primary Examiner—B. A. Reynolds
Assistant Examiner—Clifford C. Shaw
Attorney, Agent, or Firm—Lerner, David, Littenberg & Samuel

[57] ABSTRACT

A novel control arrangement is provided for controlling the operation of the heating electrodes of a brazing machine for forming a joint between an armature wire and a commutator bar. The heating electrodes are brought into contact with the armature wire and commutator bar at the point where they are to be joined, and fiber-optic means are provided for collecting radiant energy emitted from a point at or adjacent to the joint area as the joint is being heated. The collected radiant energy is converted into a usable electronic signal representative of the temperature at the joint area, and the heating electrodes are actuated on and off in response to the electronic signal when the temperature at the joint reaches predetermined upper and lower temperature levels. As a result, the temperature of the heating electrodes and joint area is maintained within a desired temperature range while the joint is being formed.

17 Claims, 6 Drawing Figures

METHOD AND APPARATUS FOR CONTROLLING A BRAZING MACHINE

FIELD OF THE INVENTION

The present invention relates generally to a method and apparatus for brazing armature wires of electric motors to corresponding commutator bars. More particularly, the present invention relates to a novel control arrangement for controlling the brazing of such armature wires to such commutator bars with a high degree of accuracy to obtain high-quality and uniform joints without annealing or disfiguring the commutator bars.

BACKGROUND OF THE INVENTION

Apparatus and methods for mass production of universal or DC electric motors have been developing for many years. Initially, soft soldering or brazing was employed to join the armature wires to the commutators. However, the need for high-quality motors which are reliable and economical has resulted in the growth and increased utilization of commutator brazing and fusing to produce such motors. In addition, in order to further improve production methods, tang-type commutators were developed, as compared to the prior slotted-type commutators, which made it simpler for attaching the armature lead wires to the commutator bars. An example of such apparatus which discloses efficient and rapid fusing of both the tang-type and slotted-type of commutators, is shown in U.S. Pat. No. 3,045,103. However, as the need has increased for extremely high-quality control and uniform commutator joints, when produced on a mass scale, there has been a desire to improve such apparatus.

The need for such careful quality control arises from the nature of commutator fusing and brazing itself. As distinguished from spot-welding processes, in commutator fusing techniques, the heating electrodes generally employed to heat the armature wires and commutator bars are high-resistance electrodes, whereas in commutator brazing, high- or low-resistance electrodes may be employed. In addition, brazing employs high-temperature solder alloys. As will be understood, the parts to form the joint are heated by the heat dissipated by these electrodes. In addition, since the armature lead wires are normally insulated, sufficient current must be applied to the electrodes so that they can be heated to a temperature sufficient to remove the insulation, but this must be carried out within a relatively short period of time so as not to damage the armature lead wires themselves. It can therefore be seen that the amount of heat applied to the joint must be controlled with a high degree of accuracy.

U.S. Pat. No. 4,079,225 discloses an arrangement for controlling brazing and fusing operations for producing high-quality and uniform joints. Although the apparatus disclosed therein has been particularly well suited for fusing operations, it has not been completely satisfactory for brazing operations. More particularly, in the arrangement disclosed therein, when a peak predetermined temperature has been reached, current to the electrodes is turned off, at which point the brazing or fusing operation takes place while the commutator bar and armature wires are cooling.

This has been generally satisfactory for fusing operations, since sufficient energy remains within the workpiece. However, in brazing operations, a brazing alloy must be applied to form the joint, and the temperature level drops below the required brazing temperature, for example 1300° F., before the brazing operation is completed. Accordingly, in order to maintain the workpiece at a temperature level sufficient for brazing, it has been necessary to overshoot the temperature level required for brazing by at least a few hundred degrees. For example, if the required brazing temperature is 1300° F., the current to the electrodes is not shut off until the temperature of the workpiece reaches approximately 1700° F. or 1800° F. In this manner, during the short time interval that it takes the workpiece to cool down to the 1300° F. level, the brazing operation can be performed. However, the disadvantage of overshooting the required brazing temperature level is that the commutator bar may be annealed, discolored, or disfigured, and in addition, the quality of the joint may be impaired at such high-temperature levels.

In view of the foregoing, there is a need for controlling brazing apparatus with a higher degree of accuracy so that the temperature level of the workpiece is maintained within a desired range while the joint is being formed without having to substantially overshoot the preferred temperature level for brazing.

Accordingly, it is an object of the present invention to provide a method and apparatus which overcomes the aforesaid problems. Specifically, it is within the contemplation of the present invention to provide an improved method and apparatus for controlling brazing operations with a high degree of accuracy to obtain high-quality and uniform joints by maintaining the heating means within a desired range to form the joint.

SUMMARY OF THE INVENTION

Briefly, in accordance with the principles of the present invention, an improved method and apparatus is provided for controlling brazing operations to provide high-quality and uniform joints between armature wires and commutator bars. Such apparatus includes means for heating the armature wire and commutator bar at the point where they are to be joined, and means for cycling the heating means on and off when the temperature at the joint reaches predetermined lower and upper temperature levels to maintain the heating means and joint area within a desired temperature range while the joint is being formed. The apparatus includes fiber-optic means for determining the temperature at a point on the commutator at or adjacent to the joint by collecting and transmitting the radiant energy emitted from said point, and means for converting that radiant energy into a usable electronic signal. This electronic signal is supplied to a comparator which in turn controls the operation of the brazing electrodes to cycle them on and off to maintain the joint area within a desired temperature range while the joint is being formed.

In a preferred embodiment of the present invention, timing means including a cycle timer are employed for measuring the length of time that the armature wires and commutator bar have been receiving heat energy from the heating electrodes, and the heating electrodes are actuated off by the cycle timer when the length of time reaches a predetermined time limit. Thus, the apparatus will terminate brazing when the predetermined length of time has expired, even though the predetermined temperature level has not yet been reached.

In the present invention, it is also preferred that the fiber-optic means includes a fiber-optic assembly having two paths, preferably concentrically arranged. The first fiber-optic path is used for transmitting the radiant energy emitted from a point at or adjacent to the joint to the means for converting that radiant energy into an electronic signal, and the second fiber-optic path, preferably associated with illumination means, is used for illuminating the point adjacent the joint to be formed, at which both paths of the fiber-optic means are aimed. The second fiber-optic path which illuminates the point thus permits more accurate aiming of the fiber-optic means at a precise point on the commutator for transmitting the radiant energy.

BRIEF DESCRIPTION OF THE DRAWINGS

Further objects, features, and advantages of the present invention will become apparent upon the consideration of the following detailed description of a presently-preferred embodiment when taken in conjunction with the accompanying drawings, wherein.

DETAILED DISCUSSION OF PREFERRED EMBODIMENTS OF THE INVENTION

Figure 1:
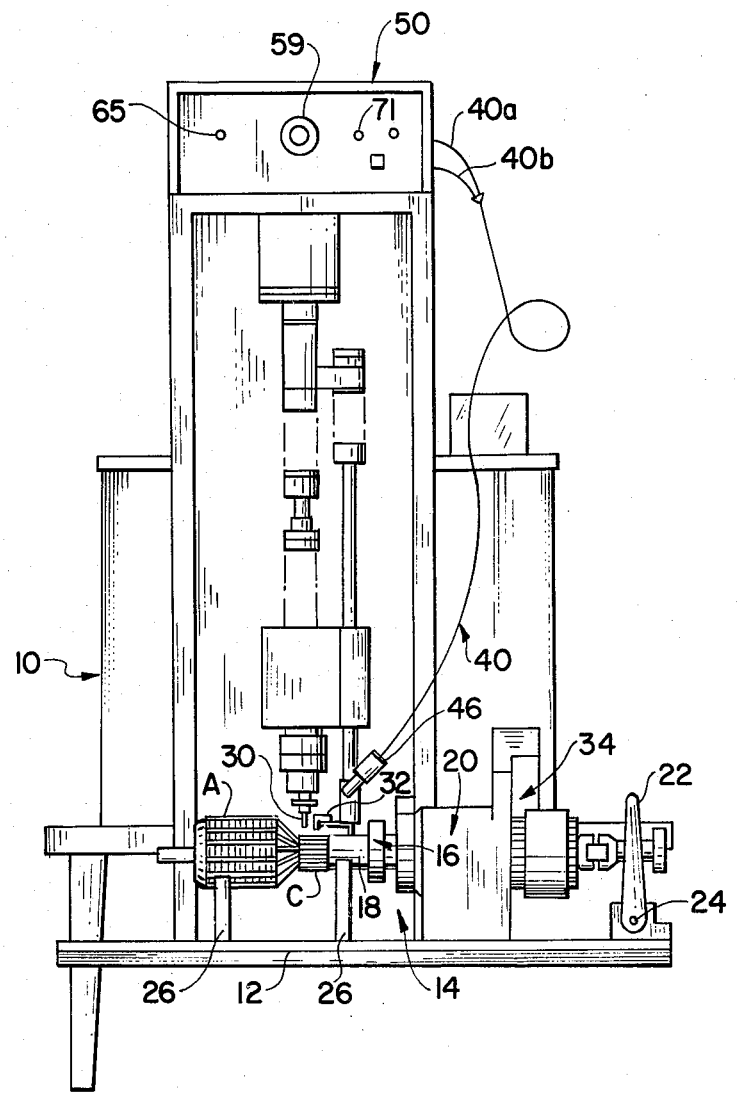
FIG. 1 is a partial front elevational view of a brazing apparatus employing the present invention.

Referring now to FIG. 1, there is shown a conventional brazing machine used in conjunction with the present invention. The particular apparatus illustrated in FIG. 1 is of a type shown in U.S. Pat. No. 3,045,103 or U.S. Pat. No. 4,079,225, and the overall description of the details of that apparatus are incorporated herein by reference thereto. As will be explained herein, the apparatus includes heating electrodes, 30, 32 for operating on armature A and commutator C.

More particularly, the apparatus includes a main frame 10 having a horizontally-disposed bed 12 which is vertically slidable on frame 10. An armature holding an indexing mechansim 14 is utilized and includes a shaft 16 on which a clutch 18 is mounted. The clutch 18 includes a socket which releasably clamps one end of the armature-commutator shaft, which is itself journaled in a bearing 20 on bed 12. The clutch mechanism itself can be manually operated by a lever 22 pivoted on bed 12 at a pivot 24. A pair of rest supports 26 is also mounted on bed 12 in order to support the armature A and commutator C in a horizontal position, so that they can be rotated for indexing each commutator bar beneath brazing electrodes 30, 32, so that the armature wires can be fused to the commutator bars. The indexing may be accomplished by any suitable means, such as pawl and ratchet mechanism 34 which rotates shaft 16 in a step-by-step manner.

Any suitable apparatus may be employed to reciprocate heating electrodes 30, 32 to and from contact with commutator C. For example, the apparatus disclosed in U.S. Pat. No. 3,045,103 may be employed and is specifically incorporated herein by reference thereto.

Figure 2:
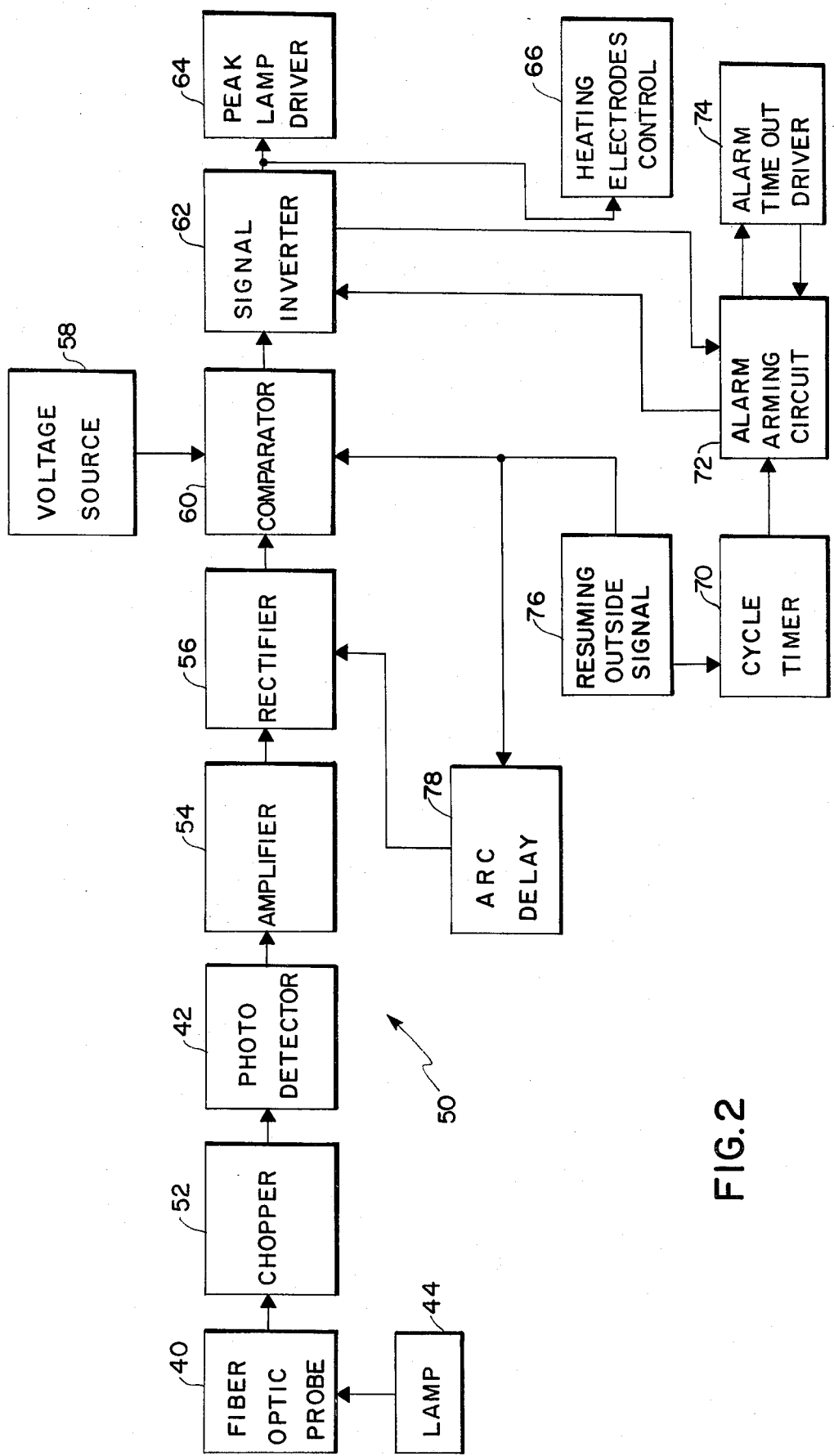
FIG. 2 is a schematic diagram of the apparatus of the present invention for controlling the brazing apparatus.

As described in U.S. Pat. No. 4,079,225, a fiber-optic probe 40 is employed in conjunction with the brazing apparatus 10 and includes a pair of concentrically-arranged fiber-optic paths. As shown in FIG. 1, the upper end of the fiber-optic probe 40 separates into the two fiber-optic paths 40a, 40b. In this manner, one of the fiber-optic paths 40a can be used for the collection and transmission of the infrared heat energy generated at a point on the commutator C at or adjacent to where the armature wires and commutator bars are joined and is transmitted to a photodetector 42. The other fiber-optic path 40b is utilized in connection with a lamp or light source 44 contained in the electronic processing unit 50 (FIG. 2). In this manner, upon actuation of the light source, light is transmitted through the fiber-optic path 40b and is aimed directly onto the commutator bar to be brazed in order to assist in aiming of the fiber-optic path 40a for receiving and transmitting the heat energy to the photodetector 42.

As will be seen in FIG. 1, the fiber-optic probe 40 is mounted on an adjustable aiming bracket 46 and includes a lens system for concentrating the energy transmitted from the commutator bar at a point on or adjacent to the brazing joint, as will be described in conjunction with FIGS. 3 through 6. The bracket 46 is mounted so that it is adjustable and may be aimed at the desired point at or adjacent to the brazing point to be formed. As noted above, the transmission of light through the fiber-optic probe 40 assists in aiming the fiber-optic probe on the desired spot of the commutator bar and also collects the infrared radiation emitted from that target area and transmits that energy by a process of multiple internal reflections to the remotely-mounted photodetector 42 contained in the electronic processing unit 50, to be described below. As is known in the art, the fiber-optic probe 40 is formed from a plurality of optical fibers and is coated with a material having a lower refractive index in order to enable the efficient transmission of infrared radiation from the heat source to the photodetector 42. Such fiber-optic means are therefore capable of detecting and transmitting such heat energy from the heated metal surface, even if this heat energy has not reached the wavelength of visible light.

Referring now specifically to FIG. 2, the energy thus collected by fiber-optic probe 40 is initially chopped or modulated in chopper 52 prior to reaching photodetector 42. This insures optimum performance of the photodetector and eliminates background temperature variations which could adversely affect the accuracy of the measurement finally obtained. Photodetector 42 converts the radiant energy received from fiber-optic probe 40 to a proportional AC electronic signal. This AC electronic signal then passes through AC amplifier 54 and demodulator or rectifier 56 to convert the AC signal back into a direct current signal. All of this comprises a portion of an analog processor.

A voltage source 58 is employed in order to present a preselected peak temperature setting which is selected by a dial 59 on the front of the electronic processing unit 50, in accordance with the required temperature of the brazing operation to be performed. A comparator 60 then compares the signal obtained from rectifier 56 with the signal from voltage source 58 to determine when the heating electrodes 30, 32 have reached the preselected peak temperature. When the peak temperature is reached, the comparator 60 sends out a signal which is inverted at 62, and this automatically activates a peak lamp driver 64 so that a visible light 65 is activated on the front panel of the electronic processing unit 50 to visually indicate to the operator that the peak temperature has been obtained. Simultaneously, signal inverter 62 operates to actuate heating electrode control 66 to cut off the supply of current to heating electrodes 30, 32, and to therefore temporarily stop the application of heat to the joint area. This may be accomplished by activating a light source, such as a light-emitting diode, and including a photocell device in the heating electrode control 66, so that activation of the light source simultaneously activates the photocell device. The output from this photocell device can then be directly attached to the contactors for the brazing apparatus itself so that activation of the light terminates the conduction of current through these contactors and terminates the brazing operation.

At this point, the brazing alloy may be applied to the joint area to begin forming the joint. However, the temperature at the commutator bar C and joint area will begin to decrease because the electrodes have been triggered off. This reduction will be sensed by fiber-optic probe 40 and photodetector 42, and as soon as the temperature at the joint area falls to a predetermined lower temperature level, this is sensed by comparator 60 which operates at such a lower threshold level to signal heating electrode control 66 to again supply current to the heating electrodes 30, 32. The temperature at the joint area again begins to increase, and when it again reaches the upper temperature level set by voltage source 58, comparator 60 and signal inverter 62 operate to actuate heating electrode control 66 to again shut off the current supply to the heating electrodes 30, 32. This on and off cycling of the heating electrodes continues until the brazing operation is completed for the particular commutator bar. This is accomplished when sufficient brazing alloy has been applied to the joint. Such brazing alloy is of the high-temperature type and may be any suitable high-temperature solder alloy, such as a copper-silver-phosphorus combination. Alternatively, a silverless alloy of copper, tin, and phosphorus may be employed. Typically, the heating electrodes are cycled on and off approximately four or five times until the brazing operation for the particular commutator bar is completed.

Advantageously, as a result of the present invention, the cycling on and off of the heating electrodes 30, 32 by the heating electrode control 66 operates to maintain the temperature of the heating electrodes and joint area in a desired temperature range to form the brazing joint. Typically, when the heating electrodes reach an upper temperature of approximately 1300° F. to 1320° F., the heating electrodes will be shut off until the temperature drops to approximately 1280° F. At this point, the heating electrodes 30, 32 will again be cycled on to bring the temperature level back up to the preset desired level of 1300° F. to 1320° F. As a result, the temperature of the heating electrodes and joint area will be maintained within a very small temperature range of approximately 1280° F. to 1320° F., during which time the brazing joint is formed. As a result, it is not necessary to overshoot the required temperature level for brazing by a few hundred degrees, as was done in the past. Advantageously, this avoids the prior art problems of annealing, discoloring, or disfiguring the commutator bar. In addition, by maintaining the temperature level within a smaller range, more uniform and high-quality brazing joints are formed.

Referring again to FIGS. 1 and 2, after the brazing operation on a selected commutator bar has been completed, the indexing mechanism 34 will operate to index the next successive commutator bar beneath heating electrodes 30, 32, so that the armature wires can be fused to the next commutator bar. Of course, this indexing function can be accomplished manually or automatically in response to completion of the brazing operation for a particular commutator bar.

In accordance with a preferred embodiment of the present invention, a timing control mechanism is also employed. A time limit is thus placed on the amount of time which can be utilized after each activation of the electrodes 30, 32 before the voltage representing the peak temperature setting is actually reached. The operation of the brazing machine will thus be terminated prior to the reaching of the peak temperature setting, if the preselected time period is first reached. This is accomplished by setting a cycle timer 70 which is performed by selecting in cycles the desired time period in a two-digit thumb wheel switch 71 located on the front of the electronic processing unit 50. Thus, if the cycle time is reached prior to the heating electrodes attaining the peak temperature level set by voltage source 58, an alarm-arming circuit 72 will be actuated. If the alarm-arming circuit 72 is activated prior to signal inverter 62 being activated by comparator 60, the alarm-arming circuit 72 will operate to disarm signal 62. Simultaneously, the alarm circuit 72 will activate an alarm time-out driver 74 to activate an audible alarm and to terminate the brazing operation in the same manner as done by heating electrode 66. If, however, signal inverter 62 is activated by comparator 60 prior to cycle timer 70 activating alarm-arming circuit 72, which means that the required temperature of heating electrodes 30, 32 is reached prior to the time period set in cycle timer 70, then signal inverter 62 will operate to disarm the alarm-arming circuit 72. Finally, if alarm-arming circuit 72 disarms or shuts off signal inverter 62, then the entire thermal monitoring system must be restarted, and the comparator 60 is reset by means of an outside signal source 76 from the brazing machine itself.

As explained in U.S. Pat. No. 4,079,225, an arc delay 78 is also employed. This retards the actual activation of the cycle timer for a short period, usually representing one or two cycles. This is preferable since, in some cases, as the heating electrodes contact the surface of the commutator bar, a short-term arc may be produced. In that case, the arc produces an abnormal temperature reading, and it is therefore desirous that this temperature not be read. Accordingly, the delay period is built into the present invention by the arc-delay mechanism 78.

Figure 3:
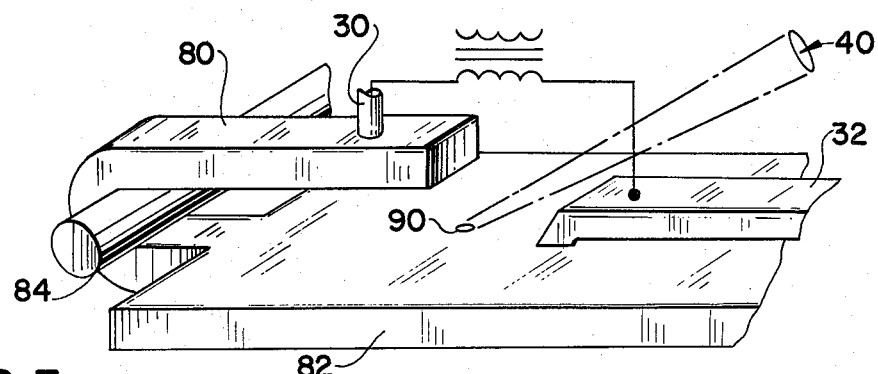
FIGS. 3 through 6 are enlarged perspective views, partially schematic, illustrating the aiming of the fiber-optic means of the present invention at a point adjacent to the brazed joint.

It is noted that the target spot or point at or adjacent to the joint between the armature wires and commutator bars, at which the fiber-optic probe 40 is aimed, is a critical point. Preferably, the fiber-optic probe 40 is precisely aimed at the commutator bar just below the high-resistance electrode 30. The probe should not, however, be aimed directly at the electrode itself because of the high intensity heat generated at that point, which would not be representative of the heat dissipation into the brazed joint and would therefore provide very little quality control over that joint. In this regard, reference is made to FIGS. 3 through 6 illustrating where the fiber-optic probe 40 should be aimed for different types of commutators. Referring specifically to FIG. 3, it shows a portion of the commutator bar of a tang-type commutator. The tang 80 extends in a U-shaped configuration from the surface of the commutator bar 82. The armature wire 82 extends through the slot of the tang 80 for brazing purposes. The brazing electrode 30 is placed on the tang, as shown, and the ground electrode 32 is placed on the surface of the commutator bar 82. FIG. 3 also shows schematically the connection between electrodes 30, 32 to the brazing transformer for controlling the current supplied to the electrodes. The electrode 30 may be formed from a low-resistance alloy, such as copper, or a high-resistance alloy, such as tungsten, while the ground electrode 32 is formed from a low-resistance alloy, such as copper. In addition, a high-temperature solder alloy is employed for brazing, such as a copper-silver-phosphorus alloy or a silverless alloy. During the brazing operation, the fiber-optic probe 40 is aimed at point or spot 90 on the commutator adjacent to the joint between the armature wire 84 and tang 80. As stated above, point 90 is displaced from the electrode 30 itself, but is at a point relative to or adjacent the location of the joint between the armature wire 84 and tang 80 on the commutator bar 82.

Figure 4:
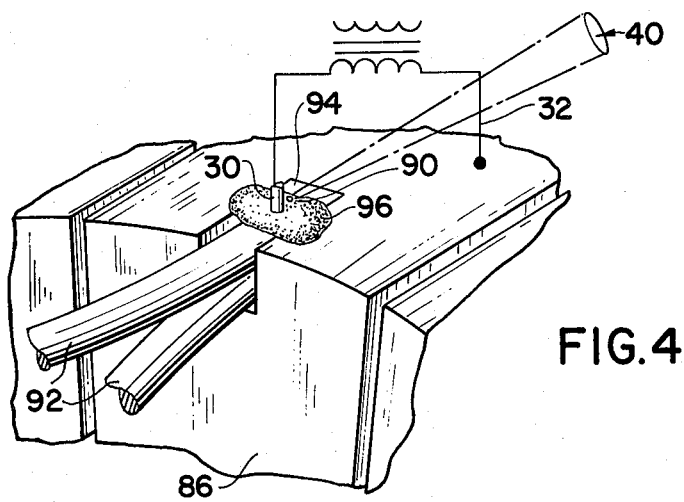

Referring now to FIG. 4, the same relationship is shown with respect to a flush slotted-type commutator bar 86. In this case, the electrodes 30, 32 are merely shown schematically. As will be seen, the armature wires 92 are placed in slot 94, and brazing alloy 96 is applied to form the joint. In this case, the fiber-optic probe 40 is shown aimed at target spot 90, which is at a point displaced from the brazing electrode 30 but at the brazed joint.

Figure 6:
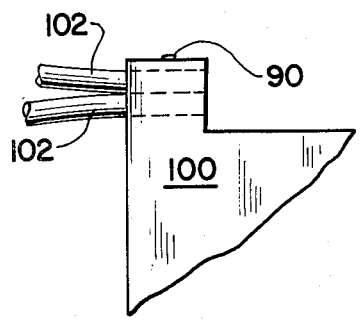
Figure 5:
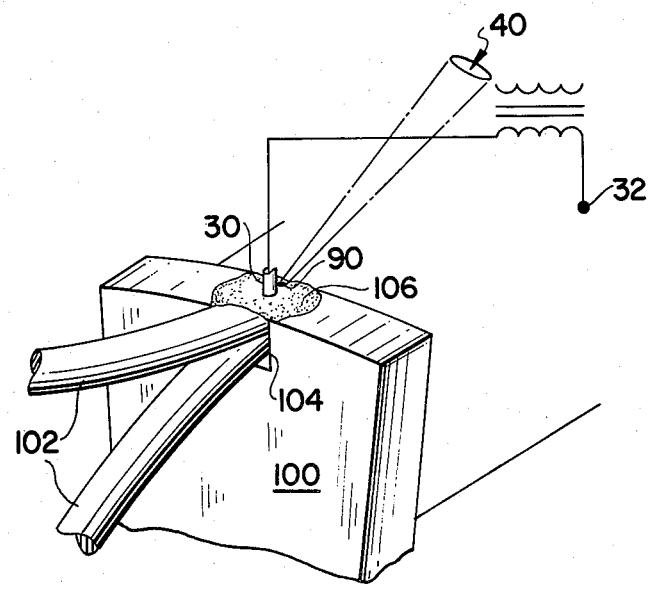

Referring now to FIGS. 5 and 6, a commutator bar 100 of the riser slotted-type commutator is shown. In this case, armature wires 102 are placed in commutator slot 104, and brazing alloy 106 is applied to the joint area. Again, the preferred target area 90 is shown displaced from the brazing electrode but at the brazed joint.

In all of the cases shown in FIGS. 3 through 6, the light transmitted by the second fiber-optic path 40b can be focused on the desired target area or spot 90 for alignment of the fiber-optic probe 40 so that the fiber-optic path 40a, which collects and transmits the radiant energy during the brazing operation, will also be aimed directly at the target area 90.

In view of the foregoing, it will be appreciated that there has been provided in accordance with the present invention a novel control arrangement for controlling the operation of heating electrodes and preferably, electrodes for forming a brazed joint. As a result of the present invention, there has been provided a method and apparatus for controlling and maintaining the heating electrodes and joint area within a desired temperature range, during which time the brazed joint is formed. This is accomplished by providing a control arrangement, wherein the heating electrodes are cycled on and off to maintain the temperature of the heating electrodes within a desired predetermined range. In this manner, overshooting of the required temperature level for brazing is no longer necessary, and possible damage to the commutator is avoided, including annealing, disfiguring, and/or discoloring of the commutator bar. As a result, a high degree of accuracy is obtained, so that a high quality and uniform joint is formed between the armature wires and the commutator bar.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for controlling heating electrodes for forming a brazed joint between an armature wire and a commutator bar, comprising electrodes for heating said armature wire and said commutator bar at the point where they are to be joined, means for moving said heating electrodes into and out of contact with said armature wire and commutator bar so as to form said joint, fiber-optic means for transmitting radiant energy emitted from a point on said commutator bar at or adjacent to said joint and displaced from said heating electrodes as said joint area is being heated, means for converting said radiant energy into a usable electrical signal representative of the temperature of said joint area, and means for deactivating said heating electrodes in response to said electrical signal when said temperature at said joint area reaches a first predetermined temperature corresponding to the temperature for forming a brazed joint and for reactivating said heating electrodes in response to said electrical signal when said temperature at said joint area falls to a second predetermined temperature which is below said first predetermined temperature but within the temperature range for brazing to maintain the temperature of said housing electrodes and joint area within the temperature range for brazing while said brazed joint is being formed.

2. The apparatus of claim 1, wherein said heating electrodes comprise a pair of electrodes including a brazing electrode and a ground electrode.

3. The apparatus of claim 1, further including timing means for measuring length of time that said heating electrodes have been applying heat energy to said joint area, and wherein said deactivating means is also operative to deactivate said heating means when said length of time reaches a predetermined time limit.

4. The apparatus of claim 3, further including means for resetting said timing means when said temperature at said joint area reaches said first predetermined temperature prior to expiration of said predetermined time limit.

5. The apparatus of claim 3, further including alarm means operative in response to said timing means reaching said predetermined time limit.

6. The apparatus of claim 1 or 3, wherein said converting means includes photodetection means for converting the radiant energy collected by said fiber-optic means into said usable electrical signal.

7. The apparatus of claim 1 or 3, wherein said deactivating means includes a comparator for comparing said usable electrical signal with a reference electrical signal.

8. The apparatus of claim 1 or 3, wherein said reactivating means includes a comparator having a lower threshold level operative to reactivate said heating means.

9. The apparatus of claim 1 or 3, wherein said fiber-optic means includes illumination means for emitting light, and said fiber-optic means having a first fiber-optic path and a second fiber-optic path, said first fiber-optic path for collecting said radiant energy and said second fiber-optic path for directing said light emitted by said illumination means onto said point at or adjacent to said joint to be formed so as to aid in aiming said fiber-optic means at said point.

10. The apparatus of claim 9, further including a lens system for concentrating said light on said point and for limiting collection of radiant energy to that energy emitted from said point.

11. The apparatus of claim 1, wherein said fiber-optic means includes concentrically-arranged first and second fiber-optic paths for collecting said radiant energy and for directing light, respectively.

12. A method for controlling heating electrodes for forming a brazed joint between an armature wire and a commutator bar, comprising the steps of:
    moving said heating electrodes into contact with said armature wire and commutator bar at the point where they are to be joined and actuating said heating electrodes to form said joint,
    collecting and transmitting radiant energy emitted from a point at or adjacent to said joint and displaced from said heating electrodes as said joint area is being heated,
    converting said radiant energy into a usable electrical signal representative of the temperature of said joint area,
    deactivating said heating electrodes in response to said electrical signal when said temperature at said joint area reaches a first predetermined temperature corresponding to the temperature for forming a brazed joint, and
    reactivating said heating electrodes in response to said electrical signal when said temperature at said joint area falls to a second predetermined temperature which is below said first predetermined temperature but within the temperature range for brazing to maintain the temperature of said heating electrodes and joint area within the temperature range for brazing while said brazed joint is being formed.

13. The method of claim 12, further including the step of measuring the length of time said heating electrodes have applied heat energy to said joint area, and deactivating said heating electrodes when said length of time reaches a predetermined time limit.

14. The method of claim 13, further including the step of actuating an alarm when said length of time reaches said predetermined time limit.

15. The method of claim 12, wherein said deactivating step includes the step of comparing said usable electrical signal with a reference electrical signal.

16. The method of claim 12, wherein said reactivating step includes the step of comparing said usable electrical signal with a lower level threshold signal.

17. The method of claim 12, further including the step of directing light onto said point at or adjacent to said joint area so as to aid in locating said point for collecting radiant energy therefrom.

* * * * *

UNITED STATES PATENT AND TRADEMARK OFFICE
CERTIFICATE OF CORRECTION

PATENT NO. : 4,224,496
DATED : September 23, 1980
INVENTOR(S) : Edward D. Riordan and John P. Mangan It is certified that error appears in the above-identified patent and that said Letters Patent are hereby corrected as shown below:

Column 6, line 22, after "disarm signal" insert --inverter--.
Column 6, line 26, after "heating electrode" insert --control--.
Column 8, line 23, "housing" should read --heating--.

Signed and Sealed this

Twentieth Day of January 1981

[SEAL]

Attest:

RENE D. TEGTMEYER

Attesting Officer

Acting Commissioner of Patents and Trademarks